(12) United States Patent
Ko et al.

(10) Patent No.: US 11,579,501 B2
(45) Date of Patent: Feb. 14, 2023

(54) LCOS STRUCTURE AND METHOD OF FORMING SAME

(71) Applicant: OMNIVISION SEMICONDUCTOR (SHANGHAI) CO., LTD., Shanghai (CN)

(72) Inventors: Pei-Wen Ko, Zhubei (TW); Chun-Sheng Fan, Hsinchu (TW)

(73) Assignee: OMNIVISION SEMICONDUCTOR (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/394,821

(22) Filed: Aug. 5, 2021

(65) Prior Publication Data
US 2022/0244603 A1 Aug. 4, 2022

(30) Foreign Application Priority Data
Feb. 4, 2021 (CN) .......................... 202110158064.4

(51) Int. Cl.
*G02F 1/1362* (2006.01)
(52) U.S. Cl.
CPC .. *G02F 1/136277* (2013.01); *G02F 1/136286* (2013.01)
(58) Field of Classification Search
CPC .................................................... G02F 1/1362
See application file for complete search history.

(56) References Cited

U.S. PATENT DOCUMENTS

| 7,728,947 | B1 * | 6/2010 | Kim ..................... G02F 1/13394 349/155 |
| 2003/0080428 | A1 | 5/2003 | Izumitani et al. |
| 2005/0142693 | A1 | 6/2005 | Higashitani et al. |
| 2005/0213000 | A1 * | 9/2005 | Akimoto ........... G02F 1/133509 349/113 |
| 2009/0102021 | A1 | 4/2009 | Chen et al. |

(Continued)

FOREIGN PATENT DOCUMENTS

| CN | 1383197 A | 12/2002 |
| CN | 1416170 A | 5/2003 |

(Continued)

*Primary Examiner* — Sang V Nguyen
(74) *Attorney, Agent, or Firm* — Womble Bond Dickinson (US) LLP

(57) ABSTRACT

The present invention provides a LCOS structure and a method for fabricating same. The LCOS structure includes: a silicon substrate; a liquid crystal layer and a transparent conductive layer both disposed above the silicon substrate. In the silicon substrate, there are formed a conductive pad, an opening where the conductive pad is exposed, and at least one metal layer. The opening is located peripherally around the liquid crystal layer, there is no portion of the metal layer located under the conductive pad. The conductive backing is located at the same vertical level as one metal layer in the at least one metal layer and electrically connected thereto, a conductive adhesive fills in the opening and a gap between the silicon substrate and the transparent conductive layer. The transparent conductive layer is electrically connected to the conductive pad by conductive metal particles in the conductive adhesive.

14 Claims, 2 Drawing Sheets

(56) References Cited

U.S. PATENT DOCUMENTS

| | | | |
|---|---|---|---|
| 2009/0284677 A1* | 11/2009 | Shin | H01L 27/124 |
| | | | 438/30 |
| 2012/0327355 A1 | 12/2012 | Cheng et al. | |
| 2014/0085579 A1 | 3/2014 | Fan | |
| 2016/0093644 A1* | 3/2016 | Ki | H01L 27/1218 |
| | | | 257/43 |
| 2018/0273809 A1* | 9/2018 | Lin | C09J 7/30 |
| 2019/0086708 A1* | 3/2019 | Fan | G02F 1/136277 |
| 2021/0286206 A1 | 9/2021 | Chung et al. | |
| 2021/0389615 A1* | 12/2021 | Rodrigues | G02F 1/133504 |

FOREIGN PATENT DOCUMENTS

| | | | | |
|---|---|---|---|---|
| CN | 1737646 | A | 2/2006 | |
| CN | 101414589 | A | 4/2009 | |
| CN | 102354069 | A | 2/2012 | |
| CN | 102854651 | A | 1/2013 | |
| CN | 107466376 | A | 12/2017 | |
| CN | 110221499 | * | 1/2021 | G02F 1/137 |
| JP | 2013-235127 | A | 11/2013 | |

* cited by examiner

LCOS STRUCTURE AND METHOD OF FORMING SAME

CROSS-REFERENCE TO RELATED APPLICATION

This application claims the priority of Chinese patent application number 202110158064.4, filed on Feb. 4, 2021, the entire contents of which are incorporated herein by reference.

TECHNICAL FIELD

The present invention pertains to the field of integrated circuit (IC) fabrication technology. In particular, it relates to an LCOS structure and a method for fabricating such a structure.

BACKGROUND

Liquid crystal on silicon (LCOS) display devices are reflective liquid crystal display (LCD) devices that "project" color images based on liquid crystal control accomplished by semiconductor silicon crystal technology. Electrical connection of a transparent conductive layer (e.g., ITO) on one side of a liquid crystal layer to metal pads on the other side of the liquid crystal layer forms an important part of the fabrication of an LCOS display device.

In an LCOS display device as shown in FIG. 1, metal pads 12 are formed on a silicon substrate 11, a liquid crystal layer 13 above the silicon substrate 11 and a transparent conductive layer 15 above the liquid crystal layer 13. The transparent conductive layer 15 is electrically connected to the metal pads 12 by a conductive adhesive 14 (e.g., a silver adhesive). The fabrication of this LCOS display device is carried out at a die-level and suffers from low productivity.

In another LCOS display device as shown in FIG. 2, metal pads 22 are formed on a silicon substrate 21, and a number of metal layers (not shown) are often formed under each metal pad 22. A liquid crystal layer 23 is formed above the silicon substrate 21 and a transparent conductive layer 25 above the liquid crystal layer 23. In this LCOS display device, the transparent conductive layer 25 is electrically connected to the metal pads 22 by a conductive adhesive 24 using a wafer-level process with higher efficiency. However, empirical testing has found that under the action of a vertical pressure applied to bond the upper transparent conductive layer 25 (e.g., ITO) to the lower silicon substrate 21, conductive metal particles contained in the conductive metallic adhesive 24 tend to pierce the metal layers under the metal pads 22 like spikes, leading to cracks in the metal layers under the metal pads 22, which often become a cause of low reliability at a later time.

In a further existing LCOS display device (not shown), a glass substrate has portions, which extend beyond a silicon substrate, for example, respectively on left and right sides of the LCOS display device, in order to accommodate electrodes to be connected to peripheral circuitry. Since these glass substrate portions designed only for connection but not for display extend from the silicon substrate in opposite directions, they may take up a significant area and lead to bulkiness of the LCOS panel.

SUMMARY OF THE INVENTION

It is therefore an object of the present invention to provide a liquid crystal on silicon (LCOS) structure with a reduced size and enhance reliability.

To this end, the present invention provides an LCOS structure comprising: a silicon substrate; and a liquid crystal layer and a transparent conductive layer disposed above the silicon substrate, wherein the silicon substrate is formed therein with a conductive backing pad, an opening in which the conductive backing pad is exposed, and at least one metal layer, and wherein: the opening is located peripherally around the liquid crystal layer; the metal layer has no portion located right under the conductive backing pad; the conductive backing pad is located at a same vertical level as one metal layer in the at least one metal layer and electrically connected to the one metal layer; the opening, together with a gap between the silicon substrate and the transparent conductive layer, is filled with a conductive adhesive; and the transparent conductive layer is electrically connected to the conductive backing pad by conductive metal particles in the conductive adhesive.

Additionally, each of the conductive metal particles may have a particle size in the range of from 5 µm to 25 µm.

Additionally, the conductive metal particles may be pure metal particles and/or composite metal particles.

Additionally, the pure metal particles may include at least one of gold particles, silver particles, copper particles and nickel particles, and the composite metal particles may include at least one of silver-plated copper particles, silver-plated gold particles, silver-plated nickel particles, gold-plated copper particles and gold-plated nickel particles.

Additionally, the silicon substrate is formed therein with a plurality of metal layers, and wherein the conductive backing pad is located at the same vertical level as, and electrically connected to, one metal layer that that is farthest away from the liquid crystal layer.

Additionally, the silicon substrate is formed therein with a plurality of metal layers, and wherein one metal layer that is closest to the liquid crystal layer serves as pixel electrodes, and wherein the pixel electrodes are arranged into an array.

Additionally, bonding pads may be formed on the surface of the silicon substrate beside the liquid crystal layer, wherein the bonding pad is exposed from the transparent conductive layer.

Additionally, the conductive backing pad may be able to withstand pressures in the range of from 1 GPa to 20 GPa.

Additionally, a glass substrate may be formed over the transparent conductive layer, a first alignment layer between the silicon substrate and the liquid crystal layer, and a second alignment layer between the liquid crystal layer and the transparent conductive layer.

The present invention also provides a method for fabricating an LCOS structure, comprising:

providing a silicon substrate formed thereabove with a liquid crystal layer and therein with a conductive backing pad, an opening in which the conductive backing pad is exposed, and at least one metal layer, wherein: the opening is located peripherally around the liquid crystal layer; the metal layer has no portion located right under the conductive backing pad; and the conductive backing pad is located at the same vertical level as one metal layer in the at least one metal layer and electrically connected to the one metal layer;

filling a conductive adhesive in the opening and over a peripheral area of the liquid crystal layer above the silicon substrate;

bonding a transparent conductive layer to the silicon substrate, wherein the transparent conductive layer is electrically connected to the conductive backing pad by conductive metal particles in the conductive adhesive.

Additionally, the conductive metal particles may be pure metal particles and/or composite metal particles.

Additionally, each of the conductive metal particles may have a particle size in the range of from 5 μm to 25 μm.

Additionally, the silicon substrate is formed therein with a plurality of metal layers, and wherein the conductive backing pad is located at the same vertical level as, and electrically connected to, one metal layer that that is farthest away from the liquid crystal layer.

Additionally, the silicon substrate is formed therein with a plurality of metal layers, and wherein one metal layer that is closest to the liquid crystal layer serves as pixel electrodes, and wherein the pixel electrodes are arranged into an array.

Additionally, bonding pads may be formed on the surface of the silicon substrate beside the liquid crystal layer, wherein the bonding pad is exposed from the transparent conductive layer.

Additionally, a glass substrate may be formed over the transparent conductive layer, a first alignment layer between the silicon substrate and the liquid crystal layer, and a second alignment layer between the liquid crystal layer and the transparent conductive layer.

Compared with the prior art, the present invention offers the benefits as follows:

it provides an LCOS structure and a method for fabricating such a structure. The LCOS structure includes: a silicon substrate; and a liquid crystal layer and a transparent conductive layer, which are both disposed above the silicon substrate. In the silicon substrate, there are formed a conductive backing pad, an opening in which the conductive backing pad is exposed, and at least one metal layer. The opening is located peripherally around the liquid crystal layer, and there is no portion of the metal layer located right under the conductive backing pad. The conductive backing is located at the same vertical level as one metal layer in the at least one metal layer and electrically connected thereto, and a conductive adhesive is filled in the opening and a gap between the silicon substrate and the transparent conductive layer. The transparent conductive layer is electrically connected to the conductive backing pad by conductive metal particles in the conductive adhesive. This design of electrical connection of the transparent conductive layer to the conductive backing pad allows internal lead of electrical signals and a reduced size of the LCOS structure. According to the present invention, since no portion of the metal layer(s) is located right under the conductive backing pad, the metal layer(s) will not be affected even when the conductive backing pad is slightly damaged (in an acceptable manner) during the bonding of the transparent conductive layer to the silicon substrate, resulting in increased reliability of the LCOS structure.

In these figures,

11: a silicon substrate; 12: a metal pad; 13: a liquid crystal layer; 14: a conductive adhesive; 15: a transparent conductive layer;

21: a silicon substrate; 22: a metal pad; 23: a liquid crystal layer; 24: a conductive adhesive; 25: a transparent conductive layer;

31: a silicon substrate; 32: a metal layer; 32c: a first metal layer; 32b: a second metal layer; 32a: a third metal layer; 33: conductive metal particles; 34: a conductive adhesive; 35: a liquid crystal layer; 36: a transparent conductive layer; 37: a glass substrate; 38: a metal layer; 38d: a first metal layer; 38c: a second metal layer; 38b: a third metal layer; 38a: a fourth metal layer; P1: a conductive pad; P2: a conductive pad; P3: a bonding pad; and V, an opening.

DETAILED DESCRIPTION

On the basis of the above, there are provided a liquid crystal on silicon (LCOS) structure and a method of forming such a structure in embodiments of the present invention. The present invention will be described in greater detail below with reference to particular embodiments illustrated in the accompanying drawings. Advantages and features of the present invention will be more apparent from the following detailed description. Note that the figures are provided in a very simplified form not necessarily drawn to exact scale, and they are only intended to facilitate convenience and clarity in explaining the disclosed embodiments.

An LCOS display device according to an embodiment of the present invention includes: a silicon substrate; and a liquid crystal layer and a transparent conductive layer, both disposed above the silicon substrate. In the silicon substrate, there are formed a conductive pad, an opening in which the conductive pad is exposed, and at least one metal layer. The opening is located peripherally around the liquid crystal layer, and the metal layer has no portion under the conductive pad. The conductive pad is located at the same vertical level as, and electrically connected to, one metal layer of the at least one metal layer. A conductive adhesive fills in both the opening and a gap between the silicon substrate and the transparent conductive layer, and the transparent conductive layer is electrically connected to the conductive pad by conductive metal particles in the conductive adhesive.

Figure 1:
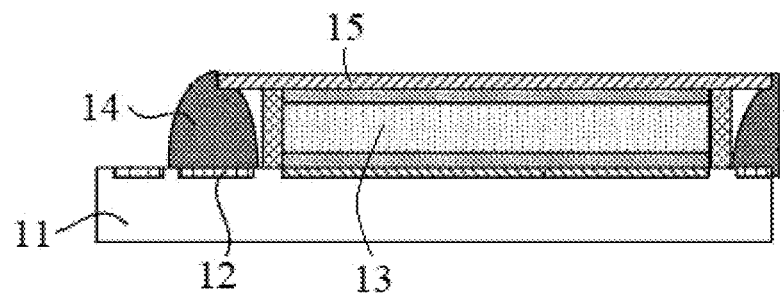
FIG. 1 is a schematic illustration of a liquid crystal on silicon (LCOS) display device.
Figure 2:
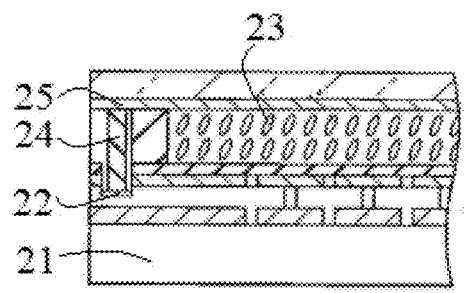
FIG. 2 is a schematic illustration of another LCOS display device.
Figure 3:
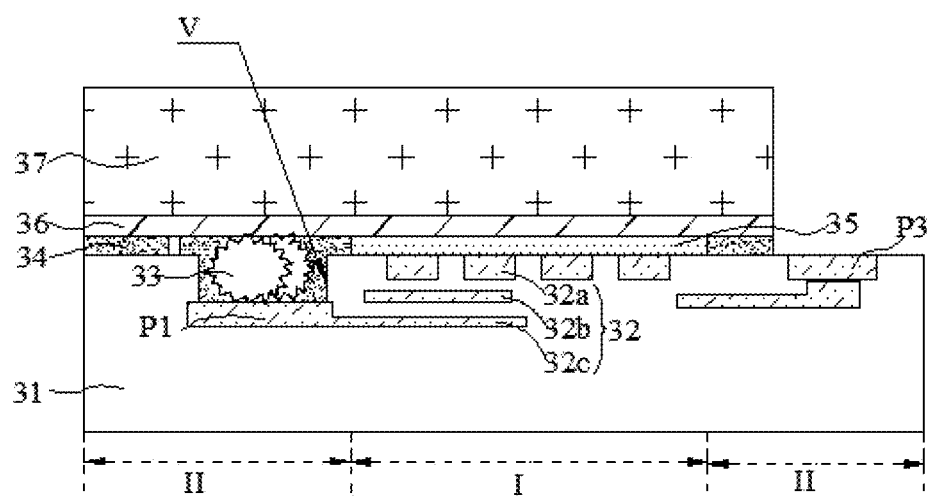
FIG. 3 is a schematic illustration of an LCOS structure according to embodiments of the present invention.

As shown in FIG. 3 the LCOS structure according to this embodiment includes: the silicon substrate 31; and the liquid crystal layer 35 and transparent conductive layer 36, which are both disposed above the silicon substrate 31. Specifically, a number of display elements may be formed above the silicon substrate 31, each including a plurality of scan lines, a plurality of data lines, a plurality of active devices (such as thin film transistors) and plurality of pixel electrodes electrically connected to the active devices. The display elements may comprise a display area I and a peripheral area II. The display area I may be an area of the silicon substrate 31 located right under the liquid crystal layer 35 and may be surrounded by the peripheral area II. The plurality of scan lines, the plurality of data lines, the plurality of active devices and the pixel electrodes electrically connected to the plurality of active devices may be formed essentially in the display area I. Bonding pads P3 may be formed on the surface of the silicon substrate 31 beside the liquid crystal layer 35, and the transparent conductive layer 36 exposes the bonding pads P3. In other words, the bonding pads P3 may be formed in the peripheral area II in order to lead electrical signals and electrically connect them to external devices.

In the silicon substrate 31, there are formed the conductive pad P1, the opening V in which the conductive pad P1 is exposed, and the at least one metal layer 32. The opening V is located peripherally around the liquid crystal layer 35 in the peripheral area II for the display elements. There is not any portion of the metal layer 32 under the conductive pad P1. The conductive pad P1 is located at the same vertical level as, and electrically connected to, one metal layer in the at least one metal layer 32. A conductive adhesive 34 fills in the opening V and a gap between the silicon substrate 31 and the transparent conductive layer 36. The transparent conductive layer 36 is electrically connected to the conductive pad P1 by conductive metal particles 33 in the conductive adhesive 34.

Conductive metal particles 33 in contact with each other may create electrically conductive paths, which impart electrical conductivity to the conductive adhesive. Stable contact between particles in the adhesive layer may result from curing or drying of the conductive adhesive. Before the conductive adhesive was cured or dried, conductive particles in the adhesive may have existed as separate particles without continuous mutual contact, making the conductive adhesive non-conductive. The curing or drying of the conductive adhesive resulted in a volume shrinkage due to solvent evaporation and material hardening. As a result, conductive particles therein exist in a state with stable continuous contact, and the adhesive conductive is therefore conductive.

The conductive adhesive 34 is provided in the peripheral area II and the conductive metal particles 33 having a large particle size of, for example, 5-25 μm, are chosen. Such a relatively large particle size is helpful in filling the opening and obtaining better conductivity. The conductive metal particles 33 may be at least one of pure metal particles and composite metal particles. The pure metal particles may include, but are not limited to, at least one of gold particles, silver particles, copper particles and nickel particles. The composite metal particles may include, but are not limited to, at least one of silver-plated copper particles, silver-plated gold particles, silver-plated nickel particles, gold-plated copper particles and gold-plated nickel particles. Such composite metal particles have good oxidation resistance and conduction properties and can be easily stored and transported without degraded physical properties. Therefore, they are conducive to high product stability and reliability.

Examples of the silicon substrate 31 may include a silicon substrate formed thereon with an interlayer dielectric layer. In this case, the at least one metal layer 32 may be buried in the interlayer dielectric layer.

Only one metal layer 32 may be provided, which is located at the same vertical level as the conductive pad P1 and electrically connected thereto. The conductive pad P1 may be formed in the same process as the only one metal layer, in which a single metal layer may be patterned by a photolithography technique using a photomask with different portions respectively for forming the conductive pad P1 and the metal layer at the same time.

Alternatively, multiple (≥2) metal layers 32 may be provided, including, for example, a first metal layer 32c, a second metal layer 32b and a third metal layer 32a. In the example of FIG. 3, the conductive pad P1 is located at the same vertical level as, and electrically connected to, the one of the multiple metal layers that is farthest from the liquid crystal layer 35 (and closest to the silicon substrate). That is, the conductive pad P1 is located at the same vertical level as, and electrically connected to, the first metal layer 32c in the silicon substrate. The conductive pad P1 may be formed in the same process as the first metal layer 32c. The conductive pad P1 and the first metal layer 32c can be considered as different portions of a single metal layer. In this case, the conductive pad P1 can be considered as a portion of the metal layer that is exposed from the opening V for electrical connection. The conductive pad P1 is able to withstand an extremely high pressure exerted thereon downward, e.g., in the range of 1-20 GPa.

The one of the multiple metal layers that is closest to the liquid crystal layer 35 (e.g., the third metal layer 32a), i.e., the topmost metal layer located over the silicon substrate 31, may serve as pixel electrodes. The pixel electrodes may be arranged into an array on the surface of the silicon substrate 31 facing the liquid crystal layer 35. The pixel electrodes may be of a reflective type and usually made of aluminum or any other suitable material with good reflective properties.

Since there is no portion of the metal layer(s) situated under the conductive pad P1, even when the conductive pad P1 is slightly damaged (in an acceptable manner) during the bonding of the transparent conductive layer 36 to the silicon substrate 31, the metal layer(s) will not be affected at all.

The transparent conductive layer 36 may cover both the liquid crystal layer 35 and the conductive adhesive 34, and a glass substrate 37 may cover the transparent conductive layer 36. The transparent conductive layer 36 may be made of, for example, indium titanium oxide (ITO). A first alignment layer may be formed between the silicon substrate 31 and the liquid crystal layer 35, and a second alignment layer may be formed between the liquid crystal layer 35 and the transparent conductive layer 36.

The at least one metal layer 32 may be made of a material comprising at least one of titanium, titanium-tungsten, aluminum, chromium, silver and copper.

In the LCOS structure of FIG. 3 according to this embodiment, the conductive pad P1 is located at the same vertical level as, and electrically connected to, the one of the metal layer(s) that is farthest away from the liquid crystal layer 35 (and closest to the silicon substrate).

Figure 4:
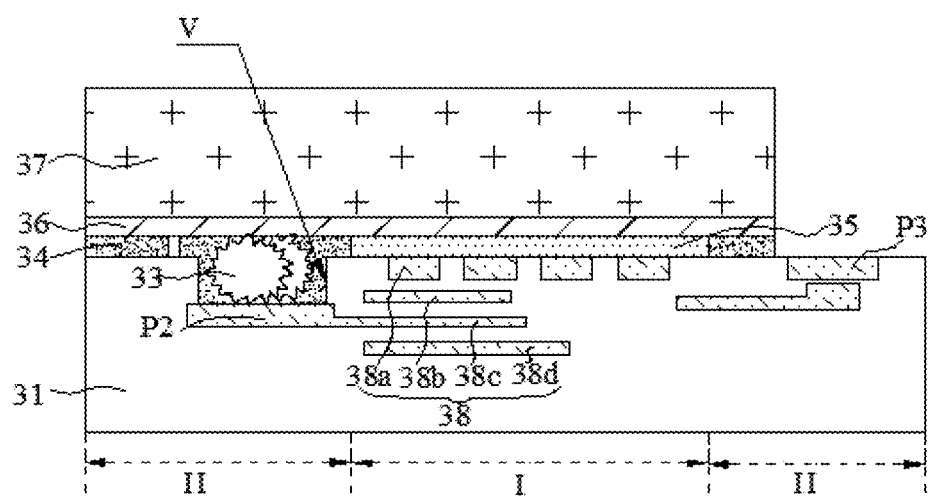
FIG. 4 is a schematic illustration of another LCOS structure according to embodiments of the present invention.

FIG. 4 shows another LCOS structure according to an embodiment of the present invention, in which a conductive pad P2 is located at the same vertical level as, and electrically connected to, one out of several metal layers. As shown in FIG. 4, the several metal layers 38 may include a first metal layer 38d, a second metal layer 38c, a third metal layer 38b and a fourth metal layer 38a, which are arranged vertically one above another in this order. As an example, the conductive pad P2 may be located at the same vertical level as, and electrically connected to, the second metal layer 38c. Moreover, the conductive pad P2 may be formed in the same process as the second metal layer 38c. The conductive pad P2 and the second metal layer 38c can be considered as different portions of a single metal layer. In this case, the conductive pad P2 can be considered as a portion of the metal layer that is exposed from the opening V for electrical connection. In the several metal layers, the one closest to the liquid crystal layer 35 (e.g., the fourth metal layer 38a), i.e., the topmost metal layer located above the silicon substrate 31, may serve as pixel electrodes. The pixel electrodes may be arranged into an array on the surface of the silicon substrate 31 facing the liquid crystal layer 35. The pixel electrodes may be of a reflective type and usually made of aluminum or any other suitable material with good reflective properties. Since there is no portion of the metal layers situated under the conductive pad P2, even when the conductive pad P2 is slightly damaged (in an acceptable manner) during the bonding of the transparent conductive layer 36 to the silicon substrate 31, the metal layers will not be affected at all.

The present invention also provides a method for fabricating an LCOS structure, comprising:

providing a silicon substrate formed thereabove with a liquid crystal layer and therein with a conductive pad, an opening in which the conductive pad is exposed, and at least one metal layer, the opening being located peripherally around the liquid crystal layer, the metal layer having no portion right under the conductive pad, the conductive pad being located at the same vertical level as one metal layer in the at least one metal layer and electrically connected to the one metal layer;

filling a conductive adhesive in the opening and over a peripheral area of the liquid crystal layer above the silicon substrate;

bonding the transparent conductive layer to the silicon substrate, the transparent conductive layer electrically connected to the conductive pad by conductive metal particles in the conductive adhesive.

Specifically, as shown in FIGS. 3 and 4, the conductive adhesive 34 may be, for example, an anisotropic conductive adhesive, and the transparent conductive layer 36 may be formed above a glass substrate 37. A hot press process may be performed with the transparent conductive layer 36 facing the silicon substrate 31 and the liquid crystal layer 35, so that the glass substrate 37, the transparent conductive layer 36 and the silicon substrate 31 are bonded together. After the conductive adhesive 34 is cooled and cured, the upper and lower substrates, together with related circuitry, may be bonded to form a display module. Since the conductive adhesive 34 contains conductive metal particles 33, when bonded, the transparent conductive layer 36 will be electrically connected to the conductive pad by conductive metal particles 33 in the conductive adhesive 34.

In summary, the present invention provides an LCOS structure and a method for fabricating such a structure. The LCOS structure includes: a silicon substrate; and a liquid crystal layer and a transparent conductive layer, which are both disposed above the silicon substrate. In the silicon substrate, there are formed a conductive pad, an opening in which the conductive pad is exposed, and at least one metal layer. The opening is located peripherally around the liquid crystal layer, and there is no portion of the metal layer situated under the conductive pad. The conductive backing is located at the same vertical level as one metal layer in the at least one metal layer and electrically connected to the one metal layer, and a conductive adhesive fills in the opening and a gap between the silicon substrate and the transparent conductive layer. The transparent conductive layer is electrically connected to the conductive pad by conductive metal particles in the conductive adhesive. This electrical connection design allows internal lead of electrical signals and a reduced size of the LCOS structure. According to the present invention, since no portion of the metal layer(s) is located right under the conductive pad, the metal layer(s) will not be affected even when the conductive pad is slightly damaged (in an acceptable manner) during the bonding of the transparent conductive layer to the silicon substrate, resulting in increased reliability of the LCOS structure.

The embodiments disclosed herein are described in a progressive manner, with the description of each embodiment focusing on its differences from others. Reference can be made between the embodiments for their identical or similar parts. Since the method embodiments correspond to the device embodiments, they are described relatively briefly, and reference can be made to the device embodiments for more details in the method embodiments.

The description presented above is merely that of some preferred embodiments of the present invention and does not limit the scope thereof in any sense. Any and all changes and modifications made by those of ordinary skill in the art based on the above teachings fall within the scope as defined in the appended claims.

What is claimed is:

1. A liquid crystal on silicon (LCOS) structure comprising: a silicon substrate; and a liquid crystal layer and a transparent conductive layer disposed above the silicon substrate, wherein the silicon substrate is formed therein with a conductive pad, an opening in which the conductive pad is exposed, and at least one metal layer, and wherein: the opening is located peripherally around the liquid crystal layer; the metal layer has no portion located right under the conductive pad; the conductive pad is located at a same vertical level as one metal layer in the at least one metal layer and electrically connected to the one metal layer; the opening, together with a gap between the silicon substrate and the transparent conductive layer, is filled with a conductive adhesive, wherein the conductive adhesive filled in the gap is in contact with each of the silicon substrate and the transparent conductive layer; and the transparent conductive layer is electrically connected to the conductive pad by conductive metal particles in the conductive adhesive.

2. The LCOS structure of claim 1, wherein each of the conductive metal particles has a particle size in a range of from 5 μm to 25 μm.

3. The LCOS structure of claim 1, wherein the conductive metal particles comprise pure metal particles and/or composite metal particles.

4. The LCOS structure of claim 3, wherein the pure metal particles include at least one of gold particles, silver particles, copper particles and nickel particles, and wherein the composite metal particles include at least one of silver-plated copper particles, silver-plated gold particles, silver-plated nickel particles, gold-plated copper particles and gold-plated nickel particles.

5. The LCOS structure of claim 1, wherein the silicon substrate is formed therein with a plurality of metal layers, and wherein the conductive pad is located at a same vertical level as, and electrically connected to, one metal layer that is farthest away from the liquid crystal layer.

6. The LCOS structure of claim 1, wherein the silicon substrate is formed therein with a plurality of metal layers, and wherein one metal layer that is closest to the liquid crystal layer provides pixel electrodes, and wherein the pixel electrodes are arranged into an array.

7. The LCOS structure of claim 1, wherein bonding pads are formed on a surface of the silicon substrate beside the liquid crystal layer, and wherein the bonding pad is exposed from the transparent conductive layer.

8. The LCOS structure of claim 1, wherein the conductive pad is able to withstand a pressure in a range of from 1 GPa to 20 GPa.

9. A method for fabricating a liquid crystal on silicon (LCOS) structure comprising:

providing a silicon substrate formed thereabove with a liquid crystal layer and therein with a conductive pad, an opening in which the conductive pad is exposed, and at least one metal layer, wherein: the opening is located peripherally around the liquid crystal layer; the metal layer has no portion located right under the conductive pad; and the conductive pad is located at a same vertical level as one metal layer in the at least one metal layer and electrically connected to the one metal layer;

filling a conductive adhesive in the opening and a gap between the silicon substrate and the transparent conductive layer, wherein the conductive adhesive filled in the gap is in contact with each of the silicon substrate and the transparent conductive layer;

bonding a transparent conductive layer to the silicon substrate, wherein the transparent conductive layer is electrically connected to the conductive pad by conductive metal particles in the conductive adhesive.

10. The method for fabricating a LCOS structure of claim 9, wherein the conductive metal particles comprise pure metal particles and/or composite metal particles.

11. The method for fabricating a LCOS structure of claim 9, wherein each of the conductive metal particles has a particle size in a range of from 5 μm to 25 μm.

12. The method for fabricating a LCOS structure of claim 9, wherein the silicon substrate is formed therein with a plurality of metal layers, and wherein one metal layer that is closest to the liquid crystal layer provides pixel electrodes, and wherein the pixel electrodes are arranged into an array.

13. The method for fabricating a LCOS structure of claim 9, wherein the silicon substrate is formed therein with a plurality of metal layers, and wherein the conductive pad is located at a same vertical level as, and electrically connected to, one metal layer that is farthest away from the liquid crystal layer.

14. The method for fabricating a LCOS structure of claim 9, wherein bonding pads are formed on a surface of the silicon substrate beside the liquid crystal layer, and wherein the bonding pad is exposed from the transparent conductive layer.

* * * * *